United States Patent [19]

Kuno et al.

[11] 4,054,781

[45] Oct. 18, 1977

[54] METHOD AND APPARATUS FOR INSTANTANEOUSLY MEASURING AND INDICATING FUEL CONSUMPTION RATE

[75] Inventors: Akira Kuno, Nagoya; Yoshio Shinoda, Okazaki; Hiroshi Arai, Toyota, all of Japan

[73] Assignees: Nippon Soken, Inc., Nishio; Toyota Jidosha Kogyo Kabushiki Kaisha, Toyota, both of Japan

[21] Appl. No.: 640,929

[22] Filed: Dec. 15, 1975

[30] Foreign Application Priority Data

Jan. 7, 1975 Japan .................................. 50-4822

[51] Int. Cl.² ...................... G01M 15/00; G06G 7/70
[52] U.S. Cl. ........................................ 364/442; 73/114
[58] Field of Search ...................... 235/150.21, 151.32, 235/92 FL, 92 MT, 92 NT, 92 CP, 61 V; 73/113, 114

[56] References Cited

U.S. PATENT DOCUMENTS

| | | | |
|---|---|---|---|
| 3,549,868 | 12/1970 | Watson et al. | 235/150.21 X |
| 3,793,882 | 2/1974 | Holben | 235/150.21 X |
| 3,812,710 | 5/1974 | Bauman et al. | 73/114 |
| 3,908,451 | 9/1975 | Walker et al. | 235/150.21 X |
| 3,921,444 | 11/1975 | Taira et al. | 235/150.21 X |

*Primary Examiner*—Joseph F. Ruggiero
*Attorney, Agent, or Firm*—Cushman, Darby & Cushman

[57] ABSTRACT

Method and apparatus for instantaneously measuring fuel consumption rate and indicating the instantaneously measuring distance traveled per unit fuel amount consumed, i.e., the instantaneous fuel consumption rate of a running vehicle. A signal representing the operating parameter of the internal combustion engine of the running vehicle measured in terms of the amount of fuel being consumed by the vehicle and another signal representing the running speed of the vehicle are separately integrated by first and second integrating circuits, whereby when the integrated value of the first integrating circuit reaches a predetermined value, the integrated value of the second integrating circuit is indicated.

8 Claims, 19 Drawing Figures

F I G. 16
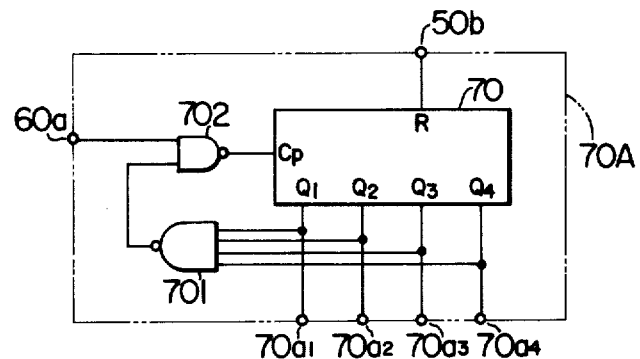
F I G. 17
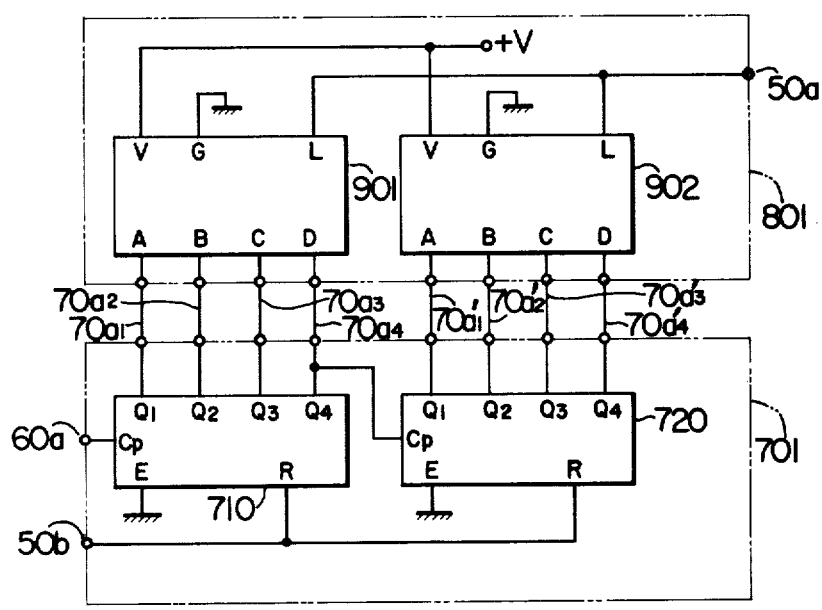

METHOD AND APPARATUS FOR INSTANTANEOUSLY MEASURING AND INDICATING FUEL CONSUMPTION RATE

BACKGROUND OF THE INVENTION

1. Field of the Invention

The present invention relates to a method for instantaneously measuring fuel consumption rate and to an apparatus installed in a vehicle, e.g., an automobile for indicating and informing the driver of the instantaneously measuring fuel consumption rate (the instantaneously measuring distance traveled per unit fuel amount consumed) of the running vehicle to give directions on the economical driving of the vehicle.

2. Description of the Prior Art

Devices of the above-type have been proposed, for example, in the Japanese Patent Application (Publication) No. 48-5453 in which the amount of fuel consumed per predetermined unit time is measured and indicated in terms of liter/sec, for example. Consequently, the measured value is not related to the distance traveled by the vehicle and an additional conversion operation is required for indicating the measured value in terms of for example km/liter, the very versatile unit for indicating the fuel consumption rate.

SUMMARY OF THE INVENTION

It is an object of the present invention to provide an instantaneously measuring fuel consumption rate meter which is capable of always indicating the fuel consumption rate in terms of the accurate distance traveled per unit fuel amount consumed (e.g., km/liter).

It is another object of the present invention to provide a fuel consumption rate meter which is designed so that instead of directly measuring the amount of fuel consumed, the amount of fuel consumed is indirectly measured by measuring the amount of air drawn into an internal combustion engine and converting it into the amount of fuel consumed.

In accordance with the present invention, there is thus provided an instantaneously measuring fuel consumption rate meter wherein a signal representing the operating parameter of the internal combustion engine of a running vehicle measured on demand in terms of the amount of fuel consumed and another signal representing the running speed of the vehicle are separately integrated by first and second integrating circuits, whereby at the instant that the integrated value of the first integrating circuit reaches a predetermined value the integrated value of the second integrating circuit is indicated on indicating means.

The device of this invention has among its great advantages the fact that when there occurs a rapid rise in the amount of fuel consumed due to the deteriorated driving conditions, the cycle time for the integrated value of the first integrating circuit to attain the predetermined value is reduced and in this way the indication follow-up speed of the fuel consumption rate on the indicating means is increased as the rate of increase in the amount of fuel consumed is increased and at the same time the accurate fuel consumption rate is always indicated in the ordinary terms of km/liter which are readily understandable by the driver.

Another great advantage of the device of this invention is that the number of revolutions per unit time N of the engine and the absolute pressure P in the engine are measured to obtain the intake fuel amount $q$ per unit time from the following equation $$q = K \cdot N \cdot P \qquad (A)$$

where K is a constant determined by the displacement (combustion chamber volume) of the engine, the mixture ratio of fuel and air and the volumetric efficiency, and the distance traveled per predetermined value of the intake fuel amount $q$ obtained from the above equation (A) is counted and indicated thereby improving the accuracy of the fuel consumption rate meter.

BRIEF DESCRIPTION OF THE DRAWING

FIG. 16 is a wiring diagram showing still another embodiment of the fuel amount unit counter circuit shown in FIG. 1.

FIG. 17 is a wiring diagram showing still another embodiments of the fuel amount unit counter circuit, the memory circuit and the indicating circuit shown in FIG. 1.

DESCRIPTION OF THE PREFERRED EMBODIMENT

Figure 1:
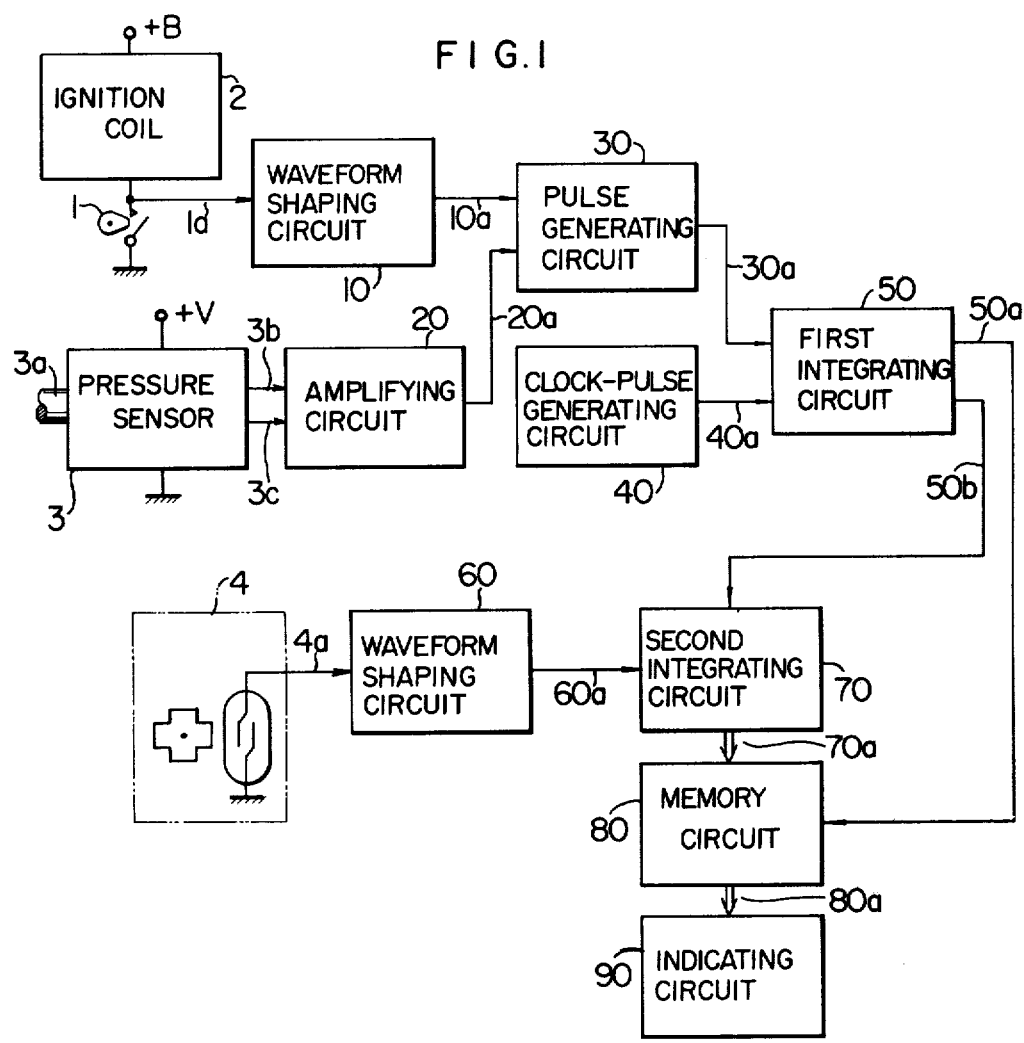
FIG. 1 is a block diagram showing the general construction of an embodiment of an instantaneously measuring fuel consumption rate meter according to the present invention.

In the block diagram of FIG. 1 showing the general construction of an embodiment of a fuel consumption rate meter according to the invention, numeral 1 designates the point switch of a distributor (not shown) mounted in an automobile which in the case of a 4-cylinder engine opens and closes twice for every revolution of the engine and generates breaking signals at a terminal 1a. Numeral 2 designates an ignition coil which is actuated by the opening and closing of the distributor point switch 1, 10 a waveform shaping circuit for reshaping the breaking signals generated at the terminal 1a in synchronism with the engine revolution and generating revolution pulses at a terminal 10a, 3 a semiconductor pressure sensor connected to the engine (not shown) through the intermediary of a rubber tube 3a for measuring the pressure in the engine and generating output signals proportional thereto. Numeral 20 designates an amplifying circuit for amplifying the output signal of the semiconductor pressure sensor 3 generated at its output terminals 3b and 3c and generating a pressure signal at a terminal 20a, 30 a pulse generating circuit for receiving as its inputs the revolution pulses generated at the terminal 10a and the pressure signal generated at the terminal 20a and generating at a terminal 30a consumption pulses having a time width proportional to the pressure signal in synchronism with the revolution pulses. Numeral 40 designates a clock pulse generating circuit for generating clock pulses having a constant frequency determined by the constant K in the above equation (A) at a terminal 40a, 50 a fuel amount unit counter circuit constituting a first integrating circuit for computing the intake fuel quantity q from the above equation (A). In this embodiment the circuit 50 is so constructed as to generate at a terminal 50a a "1" level instruction pulse when the amount of the consumed fuel obtained from the above equation (A) reaches 0.4 cc, and to generate at a terminal 50b a "1" level synchronizing pulse when the amount of fuel consumed reaches 0.4032 cc. Numeral 4 designates a vehicle speed sensor comprising a magnet fixedly mounted on the cable of a speedometer (not shown) and a reed switch disposed adjacent to the peripheral edges of the magnet to generate at a terminal 4a a speed signal consisting of four pulses for every revolution of the magnet, 60 a waveform shaping circuit for reshaping the speed signal at the terminal 4a and generating speed pulses at a terminal 60a, 70 a counting circuit for counting the speed pulses generated at the terminal 60a and constituting a second integrating circuit for starting its counting operation in synchronism with the synchronizing pulse generated at the terminal 50b, 80 a memory circuit for storing the count value of the counter circuit 70 generated at its terminal 70a, 90 an indicating circuit for indicating the stored value of the memory circuit 80 generated at its terminal 80a.

Figure 2:
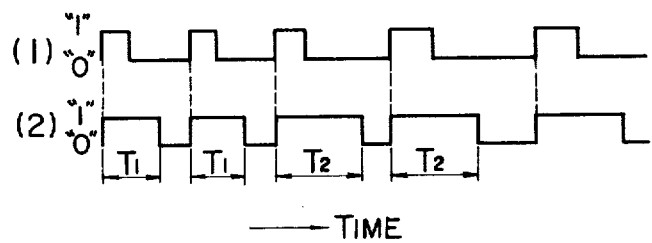
FIGS. 2 and 3 are voltage waveform diagrams which are useful in explaining the operation of the fuel consumption rate meter shown in FIG. 1.
Figure 3:
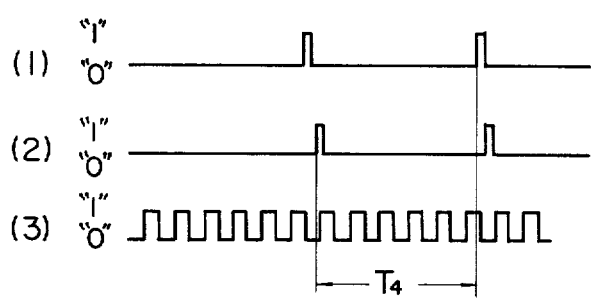

FIGS. 2 and 3 show the voltage waveforms generated at various points in the circuitry of FIG. 1. FIG. 2 (1) shows the waveform of the revolution pulses generated at the output terminal 10a of the waveform shaping circuit 10 of FIG. 1, and FIG. 2 (2) shows the waveforms of the consumption pulses generated at the terminal 30a of the pulse generating circuit 30 of FIG. 1. FIG. 2 shows that the engine internal pressure is $P_1$ mmHg when the pulse width is $T_1$, whereas the engine internal pressure is $P_2$ mmHg when the pulse width is $T_2$.

FIGS. 3 (1) and 3 (2) show respectively the waveforms of the instruction pulses and the synchronizing pulses respectively generated at the output terminals 50a and 50b of the fuel amount unit counter circuit 50 shown in FIG. 1, and FIG. 3 (3) shows the waveform of the speed pulses generated at the output terminal 60a of the waveform shaping circuit 60 of FIG. 1. FIG. 3 shows that a total of 6 speed pulses arrive during the time that the amount of fuel consumed reaches 0.4 cc and the corresponding distance traveled is 2.4 m thus giving the fuel consumption rate of 2.4/0.4 = 6. The value, 6, is stored in the memory circuit 80 and it is then indicated by the indicating circuit 90 to read 6 km/liter.

Figure 4:
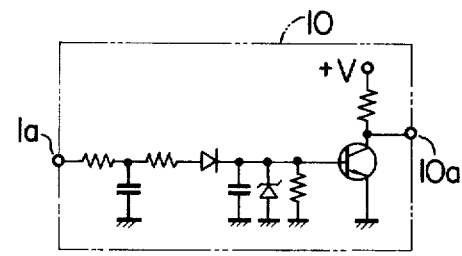
FIGS. 4, 5, 6, 7, 8, 9 and 10 are wiring diagrams showing the detail internal circuit constructions of the respective blocks in the fuel consumption rate meter of FIG. 1.
Figure 5:
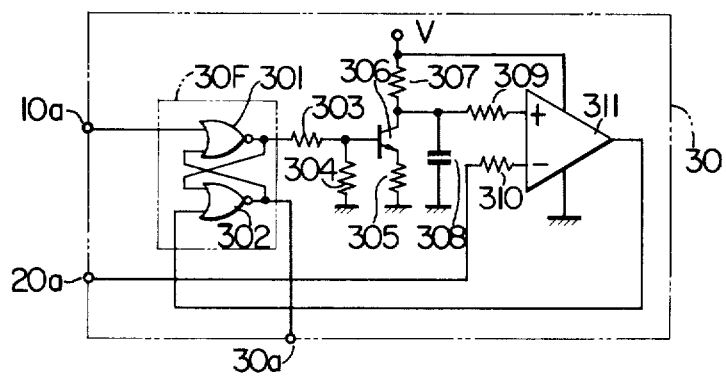

FIGS. 4 and 5 are wiring diagrams showing respectively the detail internal circuit constructions of the waveform shaping circuit 10 and the pulse generating circuit 30 shown in FIG. 1. In FIG. 4, the noise component of the breaking signals at the terminal 1a is removed to generate at the output terminal 10a rectangular revolution pulses synchronized with the revolution of the engine. In FIG. 5, when the revolution pulse at the terminal 10a goes to the "1" level, the output of a NOR gate 301 in a flip-flop 30F comprising the NOR gates 301 and 302 goes to a "0" level so that the base current flowing through resistors 303 and 304 is interrupted and a transistor 306 is turned off. When this occurs, its collector potential $V_c$ rises with a fixed time constant determined by the resistance value R of a resistor 307 and the capacitance C of a capacitor 308 according to an equation $V_c = V \cdot (1 - e^{-t/RC})$ or approximately $V_c = K \cdot C \cdot R \cdot t$, where $K$ is a constant and $t$ is a time variable. This collector potential $V_c$ is applied through a resistor 309 to the non-inverting terminal (+) of a voltage comparator 311. On the other hand, a pressure signal having a potential $E_1$ proportional to the internal pressure $P_1$ mmHg of the engine is generated at the terminal 20a and this pressure signal is applied through a resistor 310 to the inverting terminal (−) of the voltage comparator 310 so that the output of the voltage comparator 311 changes from the "0" to "1" level when $V_c$ exceeds $E_1$. When this transition occurs, the output of the NOR gate 301 in the flip-flop 30F goes to the "1" level and the transistor 306 is turned on. Consequently, the collector potential $V_c$ becomes equal to a divided voltage $V_o$ by the resistor 307 and a collector resistor 305 and the output of the voltage comparator 311 goes to the "0" level when $E_1$ exceeds $V_o$. This operation is repeated when the next "1" level pulse arrives at the terminal 10a. Consequently, a consumption pulse having the time width $T_1$ shown in FIG. 2 (2) is generated at the output terminal 30a of the NOR gate 302 in the flip-flop 30F, whereas a consumption pulse having the time width $T_2$ is generated when the engine internal pressure is $P_2$ mmHg.

Figure 6:
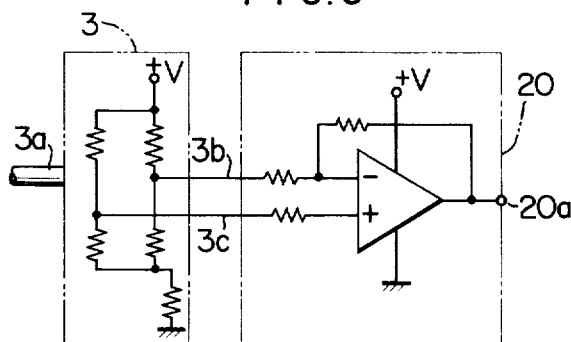

Next, FIG. 6 is a wiring diagram showing the detailed circuit constructions of the pressure sensor 3 and the amplifying circuit 20 shown in FIG. 1. The detection signal generated at the output terminals 3b and 3c of the pressure sensor 3 is amplified by the differential-type amplifying circuit 20 and a pressure signal whose magnitude is proportional to the engine internal pressure P introduced through the tube 3a is generated at the terminal 20a. The potential E of the pressure signal is set so that the potential E becomes $E_o$ and equal to the divided voltage $V_o$ by the resistors 305 and 307 in the pulse generating circuit 30 when the engine internal pressure is 1 atmospheric pressure (760 mmHg).

Figure 7:
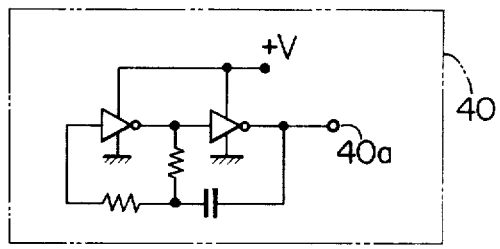
Figure 8:
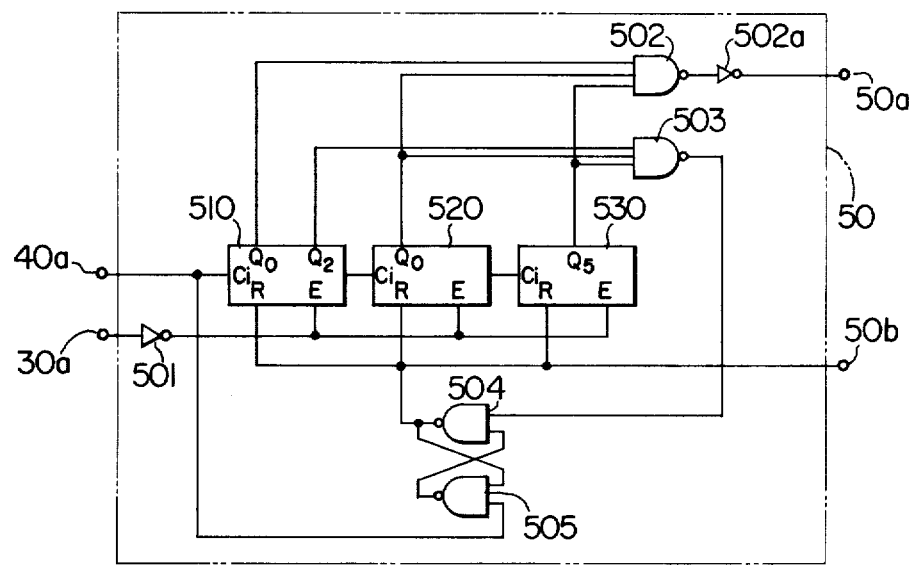

FIG. 7 is a wiring diagram showing the detail internal circuit construction of the clock pulse generating circuit 40 of FIG. 1 which comprises a known type of astable oscillator circuit. The oscillation frequency of the circuit is determined so that one cycle of the clock pulses generated at the terminal 40a corresponds to the fuel consumption of 0.8 mcc. In FIG. 8, there is illustrated a wiring diagram showing the detail internal circuit construction of the fuel amount unit counter circuit 50 of FIG. 1, in which when the "1" level consumption pulse shown in FIG. 2 (2) is generated at the terminal 30a, the pulse is inverted by a NOT gate 501 to the "0" level and the clock pulses generated at the terminal 40a are counted by decade counter divider circuits 510, 520 and 530. When a total of 500 clock pulses are generated while the respective E terminals of the decade counter divider circuits 510, 520 and 530 remain at the "0" level, their respective outputs $Q_o$, $Q_o$ and $Q_5$ go to the "1" level altogether so that the output of a NAND gate 502 goes to the "0" level and this "0" level is inverted through a NOT gate 502a to generate at the terminal 50a the "1" level instruction pulse shown in FIG. 3 (1). When the number of the applied clock pulses reaches 502, the respective $Q_2$, $Q_o$ and $Q_5$ terminals of the decade counter divider circuits 510, 520 and 530 go to the "1" level so that the output of a NAND gate 503 goes to the "0" level and the "1" level synchronizing pulse shown in FIG. 3 (2) is generated at the output of a NAND gate 504 in a flip-flop comprising the NAND gates 504 and 505 or the output terminal 50b. Simultaneously, the decade counter/divider circuits 510, 520 and 530 are all reset to start counting operation again.

Figure 9:
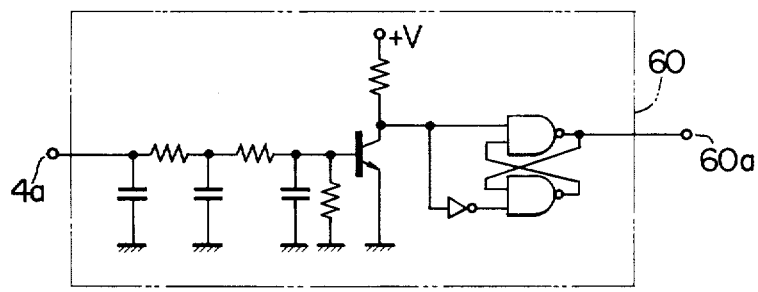

FIG. 9 is a wiring diagram showing the detail internal circuit construction of the waveform shaping circuit 60 of FIG. 1, in which the noise component of the speed signal generated at the terminal 4a of the vehicle speed sensor 4 is removed and subjected to a one-half frequency division and the reshaped speed pulses shown in FIG. 3 (3) are generated at the terminal 60a.

Figure 10:
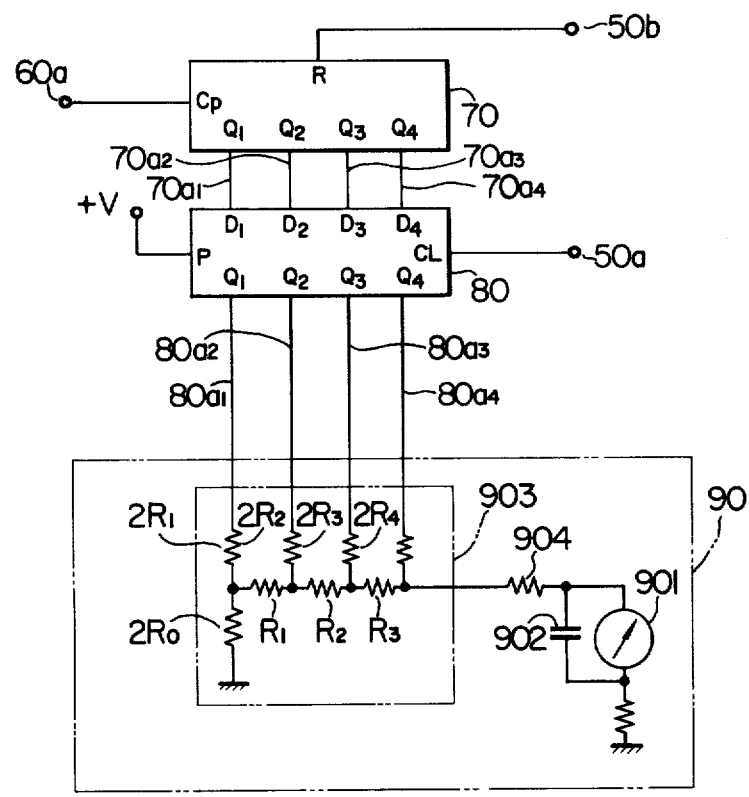

FIG. 10 is a wiring diagram showing the detailed circuit constructions of the fuel amount unit counter circuit 70, the memory circuit 80 and the indicating circuit 90 shown in FIG. 1. The synchronizing pulse generated at the output terminal 50b of the fuel amount unit counter circuit 50 is applied to the R terminal of the fuel amount unit counter circuit 70 to reset it and the speed pulses generated at the output terminal 60a of the waveform shaping circuit 60 are applied to the Cp terminal and are counted by the counter circuit 70 which in turn generates its count value at terminals $70a_1$, $70a_2$, $70a_3$ and $70a_4$ through its $Q_1$, $Q_2$, $Q_3$ and $Q_4$ terminals. In the memory circuit 80 which receives the count value of the counter circuit 70, the count value is introduced as the input data to its $D_1$, $D_2$, $D_3$ and $D_4$ terminals and the instruction pulse generated at the output terminal 50a of the fuel amount unit counter circuit 50 is applied to the CL terminal, whereby the input data is stored in response to the application of the instruction pulse and the stored value is generated at terminals $80a_1$, $80a_2$, $80a_3$ and $80a_4$ through the $Q_1$, $Q_2$, $Q_3$ and $Q_4$ terminals. The indicating circuit 90 which receives the stored value of the memory circuit 80 comprises resistors $2R_0$, $2R_1$, $2R_2$, $2R_3$, $2R_4$, $R_1$, $R_2$ and $R_3$ constituting a digital-to-analog conversion resistance ladder 903, a current controlling resistor 904, an indicating ammeter 901 and a smoothing capacitor 902. The resistance value of the current controlling resistor 904 is adjusted so that the ammeter 901 gives a maximum needle deflection when the signals at the $Q_1$, $Q_2$, $Q_3$ and $Q_4$ outputs of the memory circuit 80 are all at the "1" level, namely, the needle of the indicating ammeter 901 makes a full movement, whereas when the signals at the $Q_1$, $Q_2$, $Q_3$ and $Q_4$ terminals of the memory circuit 80 go for example to the "1", "1", "1" and "0" level, respectively, the indicating ammeter 901 gives a 7/15 needle deflection. On the other hand, if the resistance value of the current controlling resistor 904 is adjusted so that the indicating ammeter 904 gives the maximum needle deflection when the signals at the $Q_1$, $Q_2$, $Q_3$ and $Q_4$ terminals of the memory circuit 80 go to the "0", "0", "0" and "1" level, respectively, then the indicating ammeter 901 gives a 7/8 needle deflection when the $Q_1$, $Q_2$, $Q_3$ and $Q_4$ go to the "1", "1", "1" and "0" level, respectively.

Figure 11:
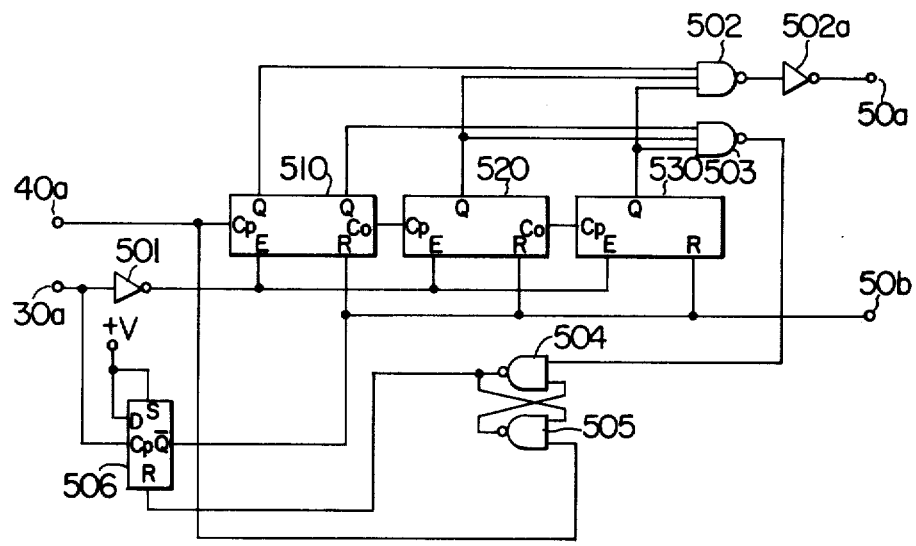
FIG. 11 is a wiring diagram showing another embodiment of the fuel amount unit counter circuit shown in FIG. 1.
Figure 12:
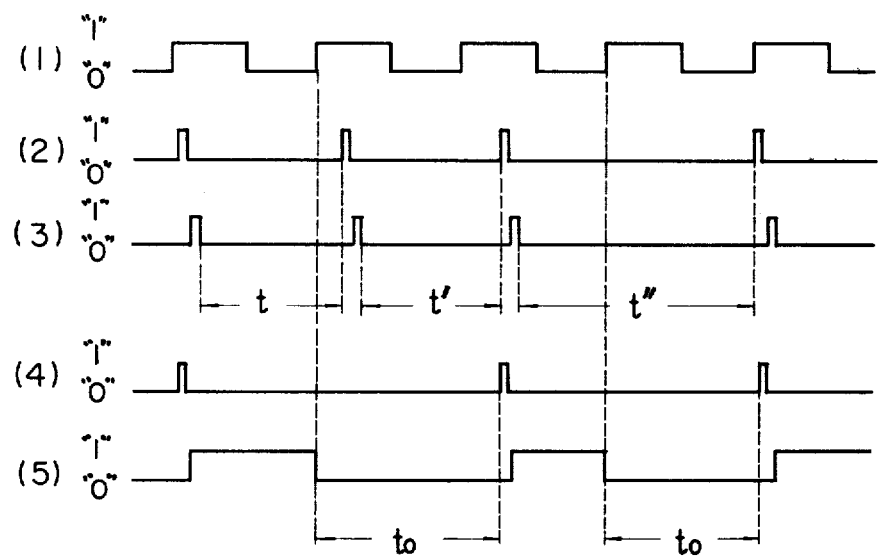
FIG. 12 is a voltage waveform diagram which is useful in explaining the operation of the counter circuit shown in FIG. 11.

FIG. 11 is a modification of the first detail internal circuit construction (FIG. 8) of the fuel amount unit counter circuit 50 shown in FIG. 1, and FIG. 12 is a voltage waveform diagram useful in explaining the operation of the circuit shown in FIG. 11. When a consumption pulse is applied to the terminal 30a, clock pulses applied to a terminal 40a during the time width of the consumption pulse are counted. With the circuit construction of FIG. 8, however, there are cases where the time duration for the same 500 clock pulses varies as shown by the time widths t, t' and t'' in FIGS. 12 (2) and 12 (3) even when the consumption pulses generated at the terminal 30a has the same time width as shown in FIG. 12 (1), namely, there occurs an error even when the consumption of fuel is constant. Consequently, to prevent such error a D-type flip-flop 506 is added as shown in FIG. 11 to generate a synchronizing pulse in synchronism with the consumption pulse and in this way the voltage waveforms at the terminals 50a and 50b correspond to a time width to as shown in FIGS. 12 (4) and 12 (5), respectively.

Figure 13:
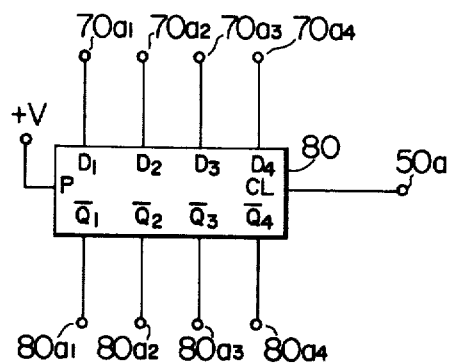
FIGS. 13 and 14 are wiring diagrams showing respectively another embodiments of the memory circuit and the indicating circuit shown in FIG. 1.
Figure 14:
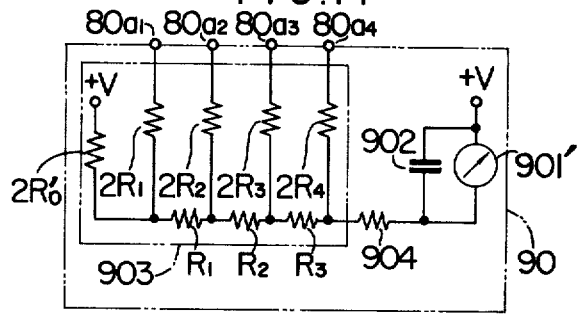

FIGS. 13 and 14 show modified constructions of the memory circuit 80 and the indicating circuit 90 which are designed so that the needle of the indicating ammeter 901 deflects in the reverse direction. Namely, in FIG. 13, the $Q_1$, $Q_2$, $Q_3$ and $Q_4$ output terminals of the memory circuit 80 are replaced with the oppositely phased $\overline{Q_1}$, $\overline{Q_2}$, $\overline{Q_3}$ and $\overline{Q_4}$ output terminals, while in FIG. 14 the resistor $2R_o$ of the resistance ladder 903 in the indicating circuit 90 is replaced with a resistor $2R'_o$ having its one end connected to the power supply and one end of an indicating ammeter 901' is also connected to the power supply.

Figure 15:
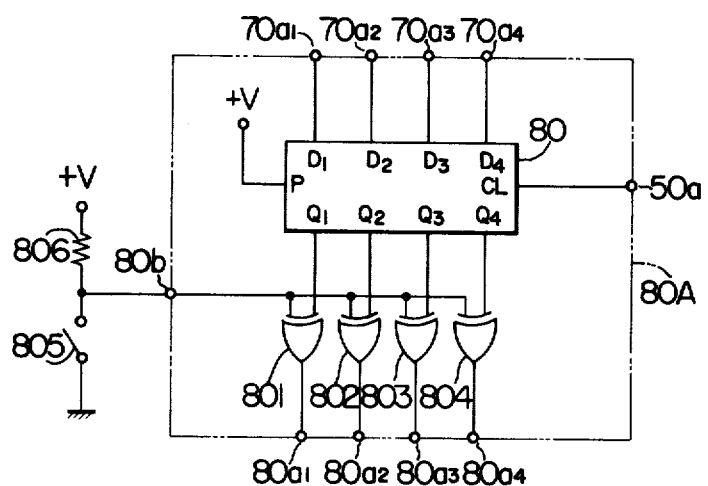
FIG. 15 is a wiring diagram showing still another embodiment of the memory circuit shown in FIG. 1.

FIG. 15 shows another embodiment of the memory circuit 80 of FIG. 10 which is designed to cause the needle of the indicating ammeter to deflect in either direction. In this second embodiment circuit 80A, EXCLUSIVE OR gates 801, 802, 803 and 804 are respectively connected between the $Q_1$, $Q_2$, $Q_3$ and $Q_4$ outputs of the memory circuit 80 and the output terminals $80a_1$, $80a_2$, $80a_3$ and $80a_4$ and the other input terminal 80b of the EXCLUSIVE OR gates 801, 802, 803 and 804 is connected to a resistor 806 and a change-over switch 805, whereby when the switch 805 is closed the signals at the $Q_1$, $Q_2$, $Q_3$ and $Q_4$ outputs of the memory circuit 80 are directly generated at the output terminals $80a_1$, $80a_2$, $80a_3$ and $80a_4$ so that the deflection of the indicating ammeter increases as the value of the memory contents increases, whereas when the switch 805 is opened the signals at the $Q_1$, $Q_2$, $Q_3$ and $Q_4$ outputs of the memory circuit 80 are inverted and generated as such at the output terminals $80a_1$, $80a_2$, $80a_3$ and $80a_4$ so that the deflection of the indicating ammeter decreases as the value of the memory contents increases.

FIG. 16 shows another embodiment of the fuel amount unit counter circuit 70 of FIG. 10. The second embodiment circuit 70A differs from the circuit of FIG. 10 in that it further comprises NAND gates 701 and 702 so that when the count value exceeds a predetermined value, the counting is locked to prevent further counting of the speed pulses generated at the terminal 60a. Namely, when the count value reaches "15", the output of the NAND gate 701 goes to the "0" level and the NAND gate 702 is closed causing its output to go to the "1" level and thereby to stop counting the speed pulses at the terminal 60a any longer.

FIG. 17 shows another embodiment of the fuel amount unit counter circuit 70, the memory circuit 80 and the indicating circuit 90 of FIG. 1 which are designed for digital indication. In the Figure, elements 710 and 720 of a counter circuit 701 comprise Motorola MC14518 integrated circuits and elements 901 and 902 of an indicating circuit 801 comprise Yokokawa Hewlett Packard (YHP) LED display elements 5082-7300, whereby in response to the synchronizing pulse at the terminal 50b the counter circuit 701 starts counting the speed pulses at the terminal 60a and delivers its count value to terminals $70a_1$, $70a_2$, $70a_3$, $70a_4$, $70a'_1$, $70a'_2$, $70a'_3$ and $70a'_4$. When, in this state, the instruction pulse generated at the terminal 50a is applied to the indicating circuit 801, the count value at that time only is read and displayed.

Figure 18:
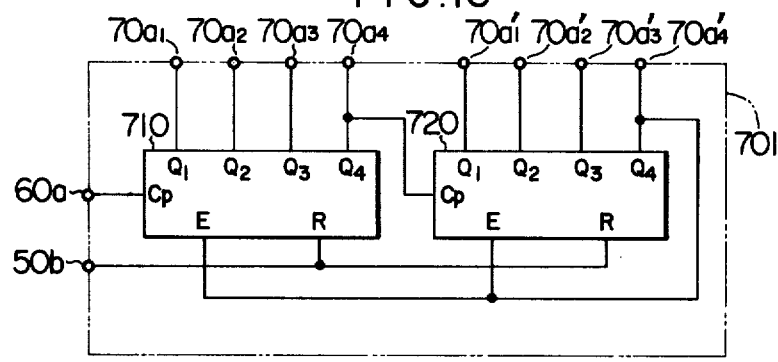
FIGS. 18 and 19 are wiring diagrams showing still another embodiments of the counting circuit shown in FIG. 17.

FIG. 18 shows another embodiment of the counter circuit 701 which is provided with an additional function so that when the count value reaches a predetermined value, the counting operation is stopped and the count value is maintained, namely, at the instant that the count value reaches 80 the counting is stopped and the count value 80 is maintained.

Figure 19:
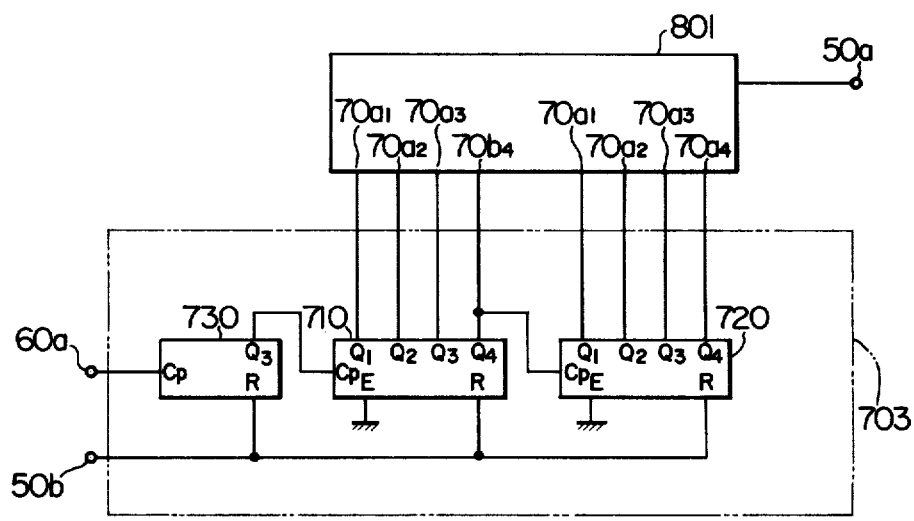

FIG. 19 shows a modification of the counter circuit 701 shown in FIG. 17, in which a one-eighth frequency divider circuit 730 is provided in the preceding stage of the counting elements 710 and 720 and in this way the counting error is reduced to one eighth of that of FIG. 10 thereby ensuring an improved accuracy. The frequency divider circuit 730 may for example be the RCA CD4024 integrated circuit.

While, in the embodiment of this invention described above, the semiconductor pressure sensor 3 is used to measure the absolute pressure of the engine, a slidable resistor may be used to generate a pressure voltage. Further, the relative pressure with respect to the atmosphere may be used in place of the absolute pressure.

We claim:

1. An apparatus for instantaneously measuring fuel consumption rate comprising:

measuring means, responsive to at least two operating parameters of an engine mounted on a vehicle, for indirectly measuring fuel amount consumed by the engine to generate a fuel signal indicative thereof, said measuring means including a pulse generating circuit which includes a flip-flop having first and second input terminals and first and second output terminals and a voltage comparator, one input terminal of said flip-flop receiving an input signal indicative of one operating parameter of the engine, one output terminal of said flip-flop being connected, through an integrator circuit having a capacitor, to one input terminal of said voltage comparator, the other input terminal of said voltage comparator receiving another input signal indicative of another operating parameter of the engine, an output terminal of said voltage comparator being connected to the other input terminal of said flip-flop, and the fuel signal being generated at the other output terminal of said flip-flop;

a speed sensor for detecting running speed of said vehicle and generating a speed signal proportional thereto;

a first circuit connected to said measuring means for integrating said fuel signal and generating an output signal indicative of a predetermined fuel consumption;

a second circuit connected to said speed sensor and said first circuit for integrating said speed signal controlled by said output signal and for generating an output signal directly proportional to running distance and inversely proportional to fuel amount consumed; and indicating means connected to said second circuit for indicating fuel consumption rate in response to said output signal of said second circuit.

2. An apparatus according to claim 1, wherein said indicating means includes conversion means for converting said output signal of said second circuit into a reciprocal signal proportional to said fuel amount consumed and inversely proportional to running distance, and an indicator for indicating fuel consumption rate in response to said signal of said conversion means.

3. An apparatus for instantaneously measuring fuel consumption rate comprising:

first detecting means for generating a first signal synchronized with the revolution of an engine of a vehicle;

second detecting means for generating a second signal corresponding to an operating parameter indicative of the amount of fuel consumed by said engine;

third detecting means for generating a third signal corresponding to running speed of said vehicle;

first computing means connected to said first and second detecting means for operating on said first and second signals to compute the time required for the consumption of a predetermined unit fuel amount and generate a fourth signal corresponding to said computed time, said first computing means including a clockpulse generating circuit, integrating means and a pulse generating circuit which includes a flip-flop and a voltage comparator, one input terminal of said flip-flop receiving said first signal, one output terminal of said flip-flop being connected, through an integrator circuit having a capacitor, to one input terminal of said voltage comparator, the other input terminal of said voltage comparator receiving said second signal, an output terminal of said voltage comparator being connected to the other input terminal of said flip-flop, and said integrating means being connected to said clockpulse generating circuit and the other output terminal of said flip-flop and generating said fourth signal;

second computing means connected to said third detecting means and said first computing means for operating on said third and fourth signals to compute the distance traveled per said unit fuel amount and generate a fifth signal corresponding to said computed distance; and indicating means connected to said second computing means for indicating the rate of fuel consumption in accordance with said fifth signal.

4. Method for instantaneously measuring fuel consumption rate comprising:

detecting the rotational speed of an engine of a vehicle;

detecting an operating parameter of said engine;

applying an output signal of said rotational speed detecting step to one input terminal of a flip-flop;

integrating one output signal generated at one output terminal of said flip-flop;

comparing the integrated output signal with an output signal of said operating parameter detecting step to generate a compared output signal;

applying said compared output signal to the other input terminal of said flip-flop to generate at the other output terminal thereof a first signal having a time width corresponding to the amount of fuel consumed;

counting constant frequency clock signals for the duration of said first signal and generating a second signal when the count of said clock signals reaches a predetermined value;

generating a third signal having a frequency corresponding to the speed of said vehicle;

counting said third signals in synchronism with said second signal; and indicating the result of the counting of said third signals.

5. An apparatus according to claim 3, wherein said second computing means includes:

a counter circuit connected to said third detecting means and said integrating means, for counting said third signal in response to said fourth signal, to generate said fifth signal;

a latch circuit connected to said counter circuit and said integrating means for storing said fifth signal; and exclusive OR gate means connected between said latch circuit and said indicating means, and connected to switch means, an output signal of said latch circuit being changed to have a complement value thereof when said switch means is actuated.

6. An apparatus according to claim 3, wherein said second computing means includes a counter circuit connected to said third detecting means and said integrating means, for counting said third signal in response to said fourth signal, to generate said fifth signal, and wherein said indicating means includes a display circuit connected to said counter circuit for displaying the rate of fuel consumption in digital form in response to said fifth signal.

7. An apparatus according to claim 3, wherein said second computing means includes:

a frequency divider circuit connected to said third detecting means, for dividing the frequency of said third signal to generate a divided output signal; and a counter circuit connected to said integrating means and said frequency divider circuit, for counting said divided output signal to generate said fifth signal.

8. An apparatus for instantaneously measuring fuel consumption rate comprising:

a first circuit for generating a fuel consumption signal whose time width corresponds to a fuel amount consumed by an engine mounted on a vehicle;

a second circuit connected to said first circuit and a clockpulse generator for measuring the time width of said fuel consumption signal by counting clock pulses of said clockpulse generator to generate a unit fuel consumption signal at every predetermined fuel consumption and a reset signal slightly after said unit fuel consumption signal;

a third circuit generating a travel distance signal whose frequency corresponds to a travelling distance of said vehicle;

a fourth circuit connected to said second and third circuits for integrating said travel distance signal to generate an integrated distance signal, said fourth circuit being reset by said reset signal;

a fifth circuit connected to said second and fourth circuits for storing said integrated distance signal to generate an output signal, said fifth circuit being reset by said unit fuel consumption signal; and a sixth circuit connected to said fifth circuit for displaying the output signal stored by said fifth circuit.

* * * * *